United States Patent [19]

Lundgren

[11] 4,407,603
[45] Oct. 4, 1983

[54] FRICTION JOINT

[75] Inventor: Bengt Lundgren, Lerum, Sweden

[73] Assignee: SKF Nova AB, Gothenburg, Sweden

[21] Appl. No.: 201,521

[22] Filed: Oct. 27, 1980

[30] Foreign Application Priority Data

Nov. 19, 1979 [SE] Sweden ................................. 7909531

[51] Int. Cl.³ .......................... B25G 3/20; F16B 2/00; F16B 7/04
[52] U.S. Cl. .................................... 403/370; 403/374; 403/409
[58] Field of Search ............... 403/367, 368, 370, 371, 403/372, 374

[56] References Cited

U.S. PATENT DOCUMENTS

| 1,064,663 | 6/1913 | Maynard | 403/367 X |
| 2,043,272 | 6/1936 | Wallgren | 403/370 X |
| 2,930,642 | 3/1960 | Howlett | 403/314 |
| 3,253,332 | 5/1966 | Howlett et al. | 403/314 X |
| 3,501,183 | 3/1970 | Stratienko | 403/371 X |
| 3,518,748 | 7/1970 | Howlett | 403/314 X |
| 3,847,493 | 11/1974 | Peter | 403/371 X |
| 4,097,167 | 6/1978 | Stratienko | 403/370 X |

Primary Examiner—Wayne L. Shedd
Attorney, Agent, or Firm—Eugene E. Renz, Jr.

[57] ABSTRACT

The invention refers to a device for producing a friction joint incorporating two members (1,2) having concentric opposite and mainly tapering surfaces, which are squeezed against each other at a relative axial displacement in one direction. The joint preferably incorporates a sleeve, on which one of said surfaces is arranged and for obtaining a minimum radial extension are the joint surfaces in longitudinal section provided with a saw tooth contour, which can be formed by a number of taper portions arranged in a row or by a helical ramp (6), which forms an angle to the center axes of the members.

8 Claims, 10 Drawing Figures

FRICTION JOINT

BACKGROUND AND SUMMARY OF THE INVENTION

The invention refers to a device for producing a friction joint of the type defined in the preamble of the annexed claim 1.

Such devices are used in different connections, e.g. for fitting different objects, such as bearing, gear wheels and the like to shafts or for interconnecting two shafts. The devices generally incorporate a sleeve with a taper surface, whereby the sleeve is intended to be displaced along a corresponding taper surface on a member enclosed in the sleeve or enclosing the sleeve, in order to be squeezed against said corresponding surface. The displacment is generally obtained by means of a nut arranged on a thread in the sleeve or on an adjacent member. The nut thereby has about the same radial dimensions as the sleeve, whereby large torsional moments are required at the tightening in order to overcome the friction resistance in threads and pressure surfaces of the nut. The taper angle of the taper surfaces must therefore be rather small in order to make sure that a desired radial pressure in the friction surfaces is obtained. This means that the joint generally will be self-braking, i.e. it will maintain its engagement also when its tightening nut has been loosened. Particular puller devices are therefore required for loosening the joint. Even if displacement members, which will give a sufficient axial force for allowing use of non-self-braking taper angles at the friction surfaces are earlier known, e.g. a number of axial screws arranged in threaded axial bores about a flange rigidly fitted to the element relative to which the sleeve is displaceable and with its end surfaces contacting one end surface of the sleeve, taper squeeze joints with large taper angles have not been used in a larger extent as such a joint would have a non-desirable radial extension.

The purpose of the present invention is to produce a friction joint, which operates according to the principle of a taper clamping sleeve, and which can be designed with a small radial extension without therefore being self-braking, whereby the joint can be easily loosened without particular aids.

This is according to the invention obtained with a device having the features defined in the accompanying claim 1.

A device according to the invention can be easily and cheaply manufactured and its use is uncomplicated. As the torque transferring ability of a small joint can be enlarged and the radial extension can be made small the device has a wide range of use.

BRIEF DESCRIPTION OF THE DRAWINGS

The invention will hereinafter be further described with reference to the accompanying drawings, in which.

DESCRIPTION OF THE PREFERRED EMBODIMENTS

Figure 1:
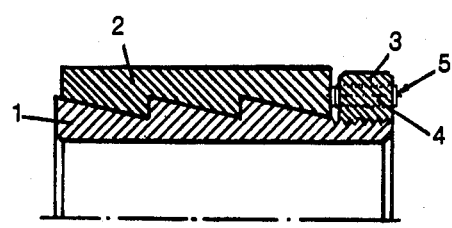
FIGS. 1, 2, 4, 5, 6, 7, 8 and 10 show longitudinal sections of devices according to different embodiments of the invention.

In FIG. 1 is shown that the device incorporates an inner member 1 and an outer member 2. The inner member is displaceable in a bore in the outer member and the members are provided with concentric opposed surfaces which are so designed and arranged as to be squeezed against each other at a relative axial displacement in one direction and will come loose from each other at displacement in the opposite direction. In order to obtain this the surfaces are so formed that they in a longitudinal section through the members form a saw tooth contour with a number of portions, which are inclined relative to the centre axes of the surfaces, whereby the surface portions of one of the surfaces, which form said portions cooperates with the corresponding surface portions in the other surface. For effecting the axial displacement at the assembly of the friction joint a flange 3 is arranged in connection to the member 1 and in the flange is made a number of axially threaded bores 4. A screw 5 is arranged in each bore, and the ends of the screws contact a radial end surface of the member 2. When tightening the screw 5, the member 2 is displaced axially on the number 1, whereby the member 2 is stretched thus that it tends to expand radially outwards and the member 1 is compressed thus that it tends to crimp radially inwards. Members 1 and 2 can be two sleeves, whereby member 1 can be arranged about a shaft and member 2 can for instance be arranged in the bore of an inner race ring of a bearing intended to be fitted on the shaft. When tightening the screws 5 the outer envelope surface of the member 2 is pressed against the inner race ring of the bearing and the inner surface of the member 1 is pressed against the envelope surface of the shaft, whereby a friction joint is formed between the bearing and the shaft. The friction in the threads and in the end surfaces of the screws 5 will cause only an insignificant loss of torsional moment, whereby a large axial force can be affected by the screws at their tightening. This means that the cooperating inclined surfaces can be given a comparatively steep pitch, which means that only a comparatively short relative axial displacement is required for producing the desired radial contact pressure in the joint. Due to the steep pitch it is possible to prevent that the joint will be self-braking, whereby the joint can be loosened simply by unscrewing the screws 5.

In the case the members 1 and/or 2 are formed as a sleeve, this can be provided with an axial slot for facilitating radial dimensional changes. For facilitating the tightening at the assembly of the joint the cooperating inclined surfaces can have low friction. For guaranteeing the ability of the joint to transfer torsional moments the members 1 and 2 can be locked against rotation relative to each other by means of suitable locking means, e.g. by letting the screw 5 engage recesses in the end surfaces of the member 2.

Figure 2:
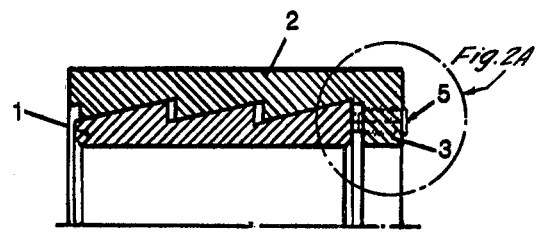

FIG. 1 shows an embodiment in which the flange 3 is designed as a nut, which is threaded onto the inner member 1. It is also possible to design the flange completely integral with one of the members. Such an embodiment is shown in FIG. 2, which shows an embodiment where the flange 3 is integral with the outer member 2, whereby the screws 5 press against an end surface of the inner member 1 at assembly of the joint.

Figure 2A:
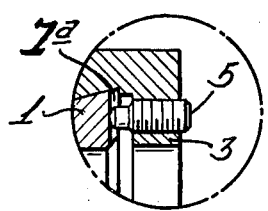
FIG. 2A is a greatly enlarged fragmentary sectional view of the area contained within the dot and dash circle of FIG. 2 and designated FIG. 2A more clearly illustrating the recess for the screw.

FIG. 2a shows the recess 7a wherein the ends of the screws engage thereby preventing relative rotation of the inner and outer members.

Figure 3:
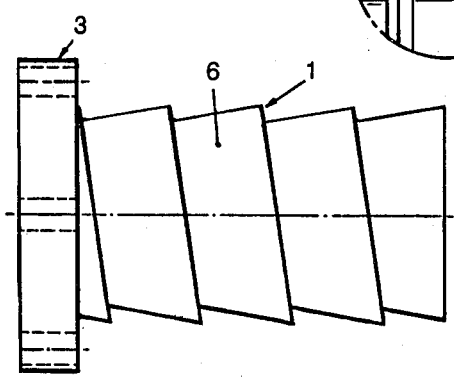
FIG. 3 shows a side view of an internal sleeve intended to be used in a device according to an embodiment of the invention.

FIG. 3 shows a preferred embodiment of an inner member with a flange 3. The inclined portions of the outer surface of the member is formed by a helical ramp 6, which thus forms a thread with a saw tooth formed longitudinal contour. The bore of the outer member is designed with a corresponding thread, whereby the outer member can be screwed onto the inner member at the manufacture of the device. The relative axial displacement of the inner and the outer members at the forming of a friction joint is obtained through tightening of screws arranged in threaded bores in the flange 3 such as described hereabove. It is thus not appropriate to try to bring about an axial displacement e.g. by rotating the outer member on the inner member with an end surface of the outer member in contact with the flange 3 and with use of a thread formed in the cooperating surfaces, as it thereby should be required a big torsional moment for overcoming the friction in the surfaces of the inner and the outer members contacting each other. The resulting axial force will thereby be too small to produce a desired radial pressure in the friction surfaces.

Figure 4:
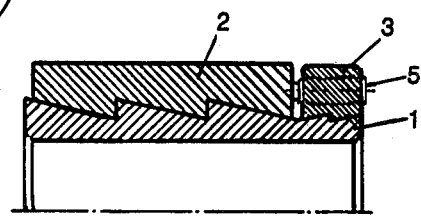

FIG. 4 shows how a flange 3 can be arranged on a member 1, thereby that the flange and the member are provided with threads having saw tooth profiles analogous to the cooperating pressure surfaces. If member 1 thereby consists e.g. of an inner sleeve intended to be pressed against a shaft the sleeve can preferably be slotted in its entire length, whereby the outer member 2 as well as the flange 3 will contribute to the increase of the radial pressure on the sleeve when the screws 5 are tightened.

Figure 5:
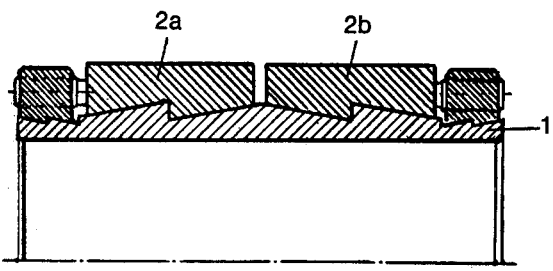

In FIG. 5 is shown an embodiment which incorporates two outer members 2a and 2b, which at the assembly of the joint are each pressed in opposite directions on its associated part of the inner member 1. Such a device can for instance be used at interconnection of two members having a bore each, whereby the member 2a is intoduced in the bore of one member and member 2b is introduced in the bore of the other member.

Figure 6:
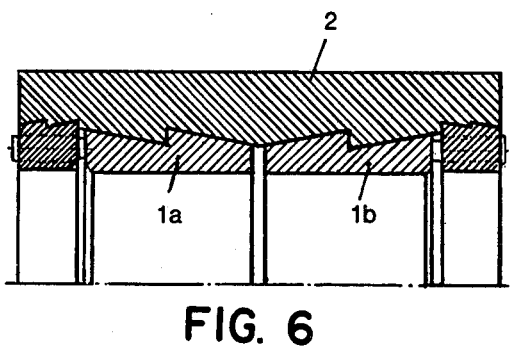

FIG. 6 shows an embodiment which is preferred at interconnection of two shafts. The device incorporates two inner members 1a and 1b, which at the assembly of the joint are displaced each one in its own part of a common outer member 2 thus that they are each pressed against an associated shaft, which shafts are introduced one in each member.

Figure 7:
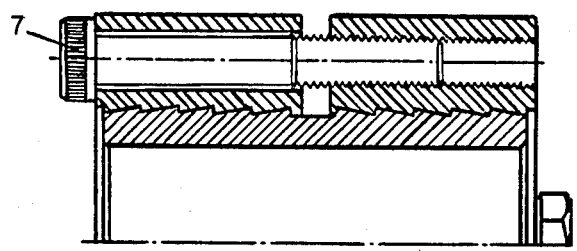

FIG. 7 shows a device which operates in principle like the device according to FIG. 5. The difference is that the means for the relative axial displacement of the inner and outer members consist of axial screws 7, which extend through clearance holes in the outer member which is engaged by each screw head and cooperates with threads in bores in the other outer member. It is of course possible also to design a device according to FIG. 6, i.e. with two inner members, in a corresponding manner.

Figure 8:
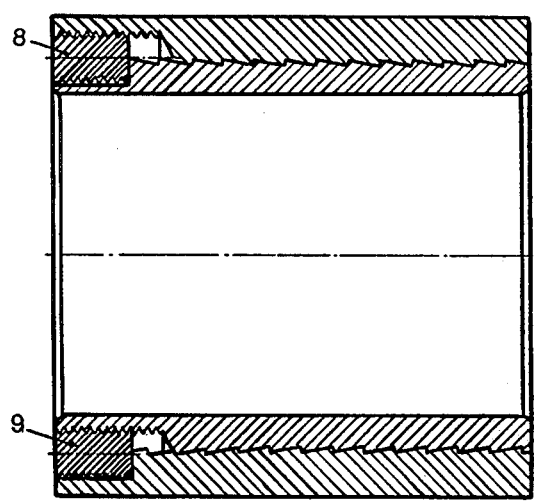
Figure 9:
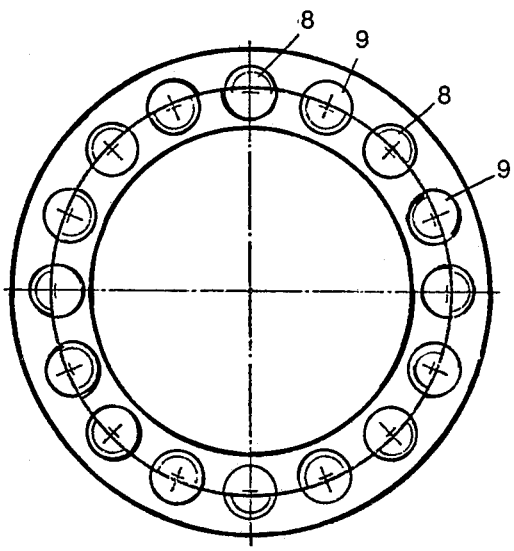
FIG. 9 shows an end view of a device according to FIG. 8.

FIGS. 8 and 9 show a longitudinal section and an end view resp. of a device, in which the outer member is displaced relative the inner member by means of screws 8, 9 arranged in axial bores, which to a half are defined by semicylindrical threaded recesses in one member and to the other half by semicylindrical smooth recesses which have a clearance relative to the screw, in the other member. At assembly the screws, which are shown at 8, are tightened. If special dismantling tools are desired these can be constituted by the screws 9. When these screws 9 are tightened after the screws 8 have been loosened, the joint will be released. As can be seen from FIG. 9 screws of the types 8 and 9 can be arranged alternatingly around the end surfaces of the outer and the inner members.

Figure 10:
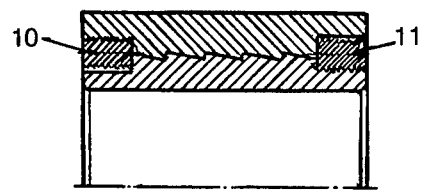

FIG. 10 shows an embodiment have displacement means 10, 11, which operate in the same manner as the screws 8 in FIGS. 8 and 9. In the device according to FIG. 10 the tightening can however be obtained from both ends of the cooperating members. At the assembly of the joint it is possible either to tighten the left hand screws 10 or the right hand screws 11 or possibly all screws.

Also other embodiments than those described hereabove are possible within the scope of the invention. It is for instance possible that the saw tooth profile surfaces are formed directly in the members intended to be interconnected, e.g. on a shaft or in a bore of a member intended to be fitted to a shaft. Instead of the squeezing surfaces being provided with helical ramps 6 they could incorporate a plurality of coaxial taper portions arranged in a row. The outer member can thereby be arranged on the inner member by being formed in two parts and after assembly being encased in a casing. It is also possible to locate a tube outside a finished inner member and thereupon with a blasting method, which will give a plastic deformation, press the tube against the inner member thus that the tube will obtain the shape of the inner member. If the members consist of an outer and an inner slotted sleeve these can in certain cases be made so elastically deformable that the inner member by compression of the inner member and stretching of the outer member can be introduced unimpeded in the bore in the outer member.

I claim:

1. A device for producing a friction joint comprising inner and outer members having concentric confronting opposed surfaces which in longitudinal section form a saw tooth contour with a number of portions inclined relative to the central axis of the surfaces and interengaging means actuating said members axially relative to one another effecting radial displacement through said inclined surfaces without rotation of said members and said means also preventing relative rotation of said members to improve torque transmitting characteristics of the device.

2. A device according to claim 1 wherein the opposed surfaces include a plurality of coaxial taper portions arranged in a row relative to one another.

3. A device according to claim 1 wherein the opposed surfaces each include a helical ramp which define cooperating threads.

4. A device according to claim 1 wherein said interengaging means actuating said members includes a plurality of screws mounted in an integral radial flange in the outer member which effect axial displacement of said members and prevent relative rotation of said members.

5. A device according to claim 4 wherein said interengaging means preventing relative rotation of said members includes a recess located in said inner member in which the screws engage.

6. A device as claimed in claim 1 wherein said means actuating said members axially relative to one another comprises a plurality of screw actuators engageable in bores in said members, at least one of said screw actuators effecting relative axial displacement of said members in one axial direction and another of said screw actuators effecting relative displacement of said members in an axial direction opposite said one direction.

7. A device according to claim 6 wherein said one screw actuator threadedly engages only one of said members and said other screw actuator threadedly engages only said other member.

8. A device according to claim 6 wherein said one screw actuator operates to create the friction joint and said other screw actuator operates to release the joint.

* * * * *